US006683249B1

(12) United States Patent
Leppin

(10) Patent No.: US 6,683,249 B1
(45) Date of Patent: Jan. 27, 2004

(54) TRANSFORMER ASSEMBLY AND TRANSFORMER COVER

(76) Inventor: Paula A. Leppin, 102 Papago Blvd., Winslow, AZ (US) 86047

( * ) Notice: Subject to any disclaimer, the term of this patent is extended or adjusted under 35 U.S.C. 154(b) by 5 days.

(21) Appl. No.: 10/318,870

(22) Filed: Dec. 13, 2002

Related U.S. Application Data

(60) Provisional application No. 60/401,401, filed on Aug. 5, 2002.

(51) Int. Cl.[7] ................................................ H02G 3/08

(52) U.S. Cl. .......................... 174/50; 174/18; 174/5 R; 336/90; 336/92; 336/65

(58) Field of Search ........................... 174/18, 50, 5 R, 174/66; 336/90, 65, 105, 92; 220/241

(56) References Cited

U.S. PATENT DOCUMENTS 3,275,900 A * 10/1885 Leonard ..................... 76/89.2
1,415,321 A * 5/1922 Eby ............................ 174/18
3,740,685 A * 6/1973 Fisher ........................ 336/192

* cited by examiner

*Primary Examiner*—Dhiru R Patel
(74) *Attorney, Agent, or Firm*—Jeffrey D. Moy; Weiss, Moy & Harris P.C.

(57) ABSTRACT

A transformer includes an end, and electrical insulator bushings are attached to and extend away from the end of the transformer. Conductors extend from the electrical insulator bushings. A cover has openings and an attachment end affixed to the transformer. The cover shields the end of the transformer and the electrical insulator bushings preventing animals from alighting on the end of the transformer and the electrical insulator bushings. The conductors each extend through one of the openings of the cover. The cover has an access panel movable between a closed position and an open position permitting access to the end of the transformer and the electrical insulator bushings without having to detach the attachment end of the cover from the transformer.

33 Claims, 5 Drawing Sheets

TRANSFORMER ASSEMBLY AND TRANSFORMER COVER

CROSS-REFERENCE TO RELATED APPLICATIONS

This application claims the benefit of United States Provisional Application Serial No. 60/401,401, filed Aug. 5, 2002.

FIELD OF THE INVENTION

This invention relates to transformers and to apparatus and methods for preventing animals from alighting on transformers.

BACKGROUND OF THE INVENTION

Electrical power outages caused by animals climbing or perching on electrical transformers is a common problem in the electrical utilities industry. An animal, such as a squirrel or bird, climbing or perching on the transformer will sometimes contact a high voltage power line adjacent the transformer with it's tail or wing, which causes a short circuit between the power line and the transformer. In an effort to prevent this, skilled artisans have developed insulated animal guards and other forms of insulated devices designed to insulate the electrical insulator bushings. However, known forms of insulator bushings are difficult to install, expensive, and must be removed in order to allow the electrical bushings to be access for maintenance and replacement. Given these and other deficiencies in the art, the need for certain new and useful improvements is evident.

SUMMARY OF THE INVENTION

The above problems and others are at least partially solved and the above purposes and others realized in an exemplary apparatus embodiment of the invention, which consists of a transformer having an end, a first electrical insulator bushing attached to and extending away from the end of the transformer, a first conductor extending from the first electrical insulator bushing, and a cover having a first opening. The cover is affixed to the transformer shielding the end of the transformer and the first electrical insulator bushing preventing animals from alighting on the end of the transformer and the first electrical insulator bushing. In accordance with the invention, the conductor extends through the first opening of the cover from inside the area contained by the cover. The cover has an outer surface that is sufficiently angled to frustrate animals from alighting thereon. The cover is at least partially transparent, and has an apex, which opposes the upper end of the transformer and serves to prevent animals from alighting thereon. The cover can be entirely transparent, if desired. The first opening of the cover is disposed proximate the apex. The immediate embodiment incorporates a bracket that functions to releasably affix the cover to the transformer. In accordance with the invention, any attachment structure capable of releasably securing the cover to the transformer can be employed. The cover is fashioned with an attached access panel movable between a closed position and an open position permitting access therethrough to the end of the transformer and the first electrical insulator bushing. A second electrical insulator bushing is also provided, which is attached to and extends away from the end of the transformer. A second conductor extends from the electrical insulator bushing. The cover has a second opening, and the second conductor extends through the second opening.

In accordance with the invention, another apparatus embodiment consists of a transformer having an end. First and second electrical insulator bushings attached to and extend away from the end of the transformer. A first conductor extends from the first electrical insulator bushing, and a second conductor extends from the second electrical insulator bushing. A cover has a first opening, a second opening, and an attachment end affixed to the transformer. The cover shields the end of the transformer and the first and second electrical insulator bushings preventing animals from alighting on the end of the transformer and the first and second electrical insulator bushings. The first conductor extends through the first opening of the cover, and the second conductor extends through the second opening of the cover. The cover has an outer surface that is sufficiently angled to frustrate animals from alighting thereon. The cover is at least partially transparent, and has an apex, which opposes the upper end of the transformer and serves to prevent animals from alighting thereon. The cover can be entirely transparent, if desired. The first and second openings of the cover are disposed proximate the apex. The immediate embodiment incorporates a bracket that functions to releasably affix the cover to the transformer. In accordance with the invention, any attachment structure capable of releasably securing the cover to the transformer can be employed. The cover is fashioned with an attached access panel, which is movable between a closed position and an open position permitting access therethrough to the end of the transformer and the first and second electrical insulator bushings. A gap exists between the attachment end of the cover and the transformer, permitting water and debris to pass therethrough.

In accordance with the invention, yet another apparatus embodiment includes a transformer, a first electrical insulator bushing and an attached first conductor, and a cover having an access panel. The transformer has an end, the first electrical insulator bushing is attached to and extends away from the end of the transformer, and the first conduct extends from the first electrical insulator bushing. The cover has an access panel and a first opening. The cover is affixed to the transformer and shields the end of the transformer and the first electrical insulator bushing preventing animals from alighting on the end of the transformer and the first electrical insulator bushing. The first conductor extends through the first opening of the cover. The access panel is movable between a closed position and an open position permitting access therethrough to the end of the transformer and the first electrical insulator bushing. The cover has an outer surface that is sufficiently angled to frustrate animals from alighting thereon. The cover is at least partially transparent, and has an apex, which opposes the upper end of the transformer and serves to prevent animals from alighting thereon. The cover can be entirely transparent, if desired. The first opening of the cover is disposed proximate the apex. The immediate embodiment incorporates a bracket that functions to releasably affix the cover to the transformer. In accordance with the invention, any attachment structure capable of releasably securing the cover to the transformer can be employed. A second electrical insulator bushing is also provided, which is attached to and extends away from the end of the transformer. A second conductor extends from the electrical insulator bushing. The cover has a second opening, and the second conductor extends through the second opening.

In accordance with the invention, still another apparatus embodiment includes a transformer, a first electrical insulator bushing having an attached first conductor, a second electrical insulator bushing having an attached second conductor, and a cover having an access panel. T transformer has an end, and the first and second electrical insulator bushings are attached to and extend away from the end of the transformer. The first conductor extends from the first electrical insulator bushing, and the second conductor extends from the second electrical insulator bushing. The cover has a first opening, a second opening, and an attachment end affixed to the transformer. The cover shields the end of the transformer and the first and second electrical insulator bushings preventing animals from alighting on the end of the transformer and the first and second electrical insulator bushings. The first conductor extends through the first opening of the cover, and the second conductor extends through the second opening of the cover. The access panel is movable between a closed position and an open position permitting access therethrough to the end of the transformer and the first and second electrical insulator bushings. The cover has an outer surface that is sufficiently angled to frustrate animals from alighting thereon. The cover is at least partially transparent, and has an apex, which opposes the upper end of the transformer and serves to prevent animals from alighting thereon. The cover can be entirely transparent, if desired. The first and second openings of the cover are disposed proximate the apex. The immediate embodiment incorporates a bracket that functions to releasably affix the cover to the transformer. In accordance with the invention, any attachment structure capable of releasably securing the cover to the transformer can be employed. A gap exists between the attachment end of the cover and the transformer, permitting water and debris to pass therethrough.

In a transformer including an upper end having a perimeter edge and at least one attached electrical conductor assembly consisting of an electrical insulator bushing attached to and extending away form the upper end of the transformer and a conductor extending from the electrical insulator bushing, the invention provides a cover having an annular attachment end, an opposing distal extremity, and an opening. The immediate embodiment incorporates a mechanism, such as a bracket, for releasably securing the annular attachment end of the cover to the perimeter edge of the upper end of the transformer so as to permit the cover to shield the end of the transformer and the electrical insulator bushing preventing animals from alighting on the end of the transformer and the electrical insulator bushing. The opening of the cover is for accommodating the conductor. It is to be understood that any attachment structure capable of releasably securing the cover to a transformer can be employed, in accordance with the principle of the invention. The cover has an outer surface that is sufficiently angled to frustrate animals from alighting thereon. The cover is at least, partially transparent, and has an apex disposed at the distal extremity thereof opposing the annular attachment end. The cover can be entirely transparent, if desired. The opening of the cover is disposed proximate the distal extremity, and the cover is fashioned with an attached access panel movable between a closed position and an open position.

Consistent with the foregoing summary of various embodiments of the invention, the invention also contemplates associated apparatus and method embodiments.

BRIEF DESCRIPTION OF THE DRAWINGS

Referring to the drawings.

DETAILED DESCRIPTION OF A PREFERRED EMBODIMENT

Figure 1:
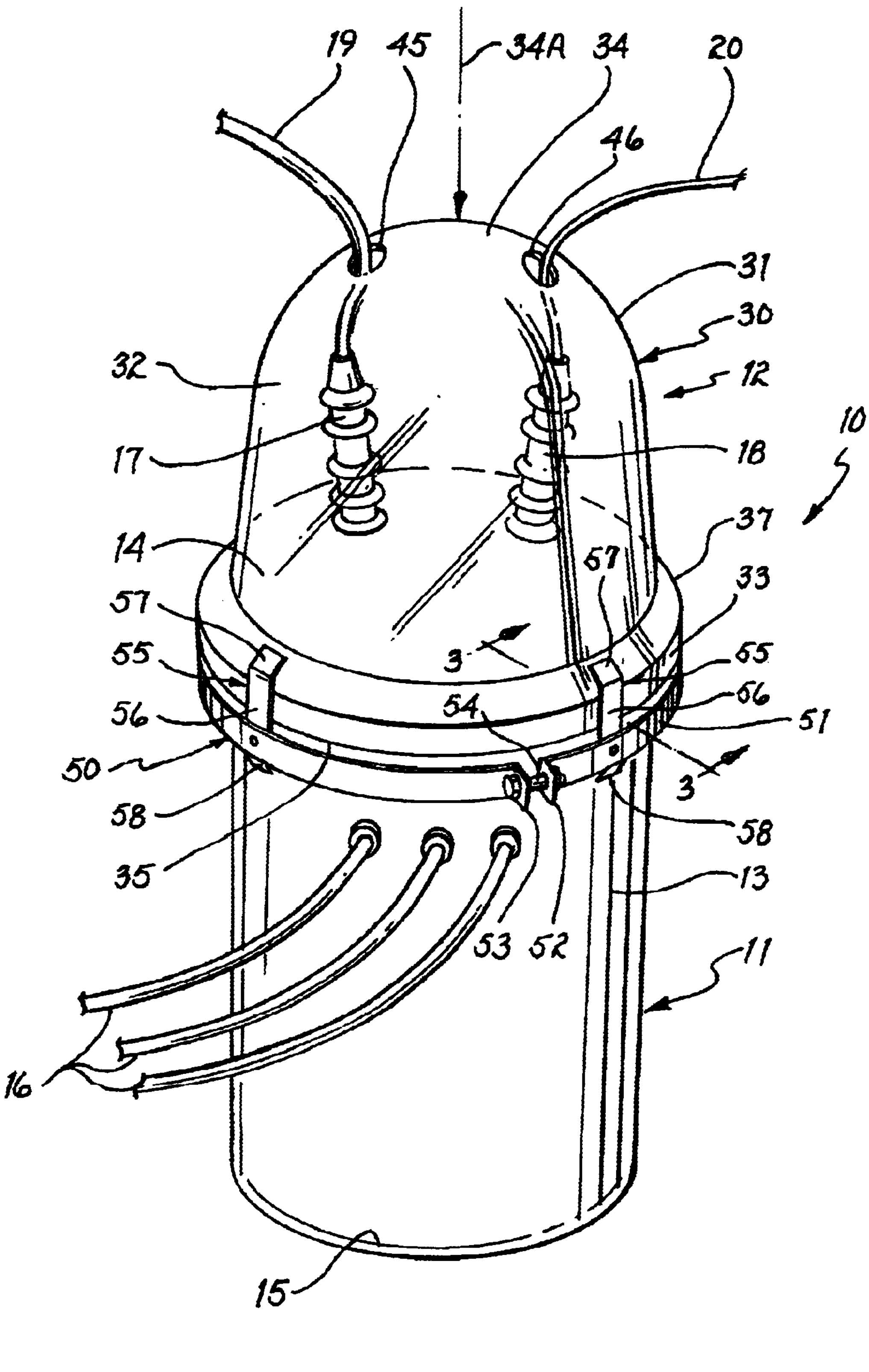
FIG. 1 is a perspective view of a transformer assembly including a transformer having an attached cover, in accordance with the principle of the invention.

Turning now to the drawings, attention is first directed to FIG. 1, in which is seen a transformer assembly, generally designated by the reference character 10, including an electric transformer 11 and an attached cover 12. Transformer 11 includes a housing 13 having an upper end or top 14 and a lower end or bottom 15. Wires 16 project from housing 13 between upper and lower ends 14,15. Electrical insulator bushings 17, 18 are attached to and extend away from upper end 14. Wires or conductors 19,20, are attached to and extend away from bushings 16,17, respectively. Upper end 14 of transformer has a marginal perimeter extremity, which is denoted generally at 21 in FIGS. 2 and 3.

The foregoing brief description of transformer 11 is intended to be generally representative of a conventional two bushing primary transformer. A two bushing primary transformer, like transformer 11, is usually pole-mounted and commonly used by industries and utilities in a three-phase bank (three single-phase transformers connected together to provide three-phase power). However, a two bushing primary transformer can be used individually without banking. Although two bushing transformers, like transformer 11, are usually mounted on electrical service poles, usually at the level of the overhead cables, some installations provide ground level mounting. Details of transformer 11 not specifically illustrated and described will be readily understood and appreciated by those skilled in the art. Although the invention is discussed in connection with a two bushing primary transformer, the invention can be used with a single bushing primary transformer, if desired, which is a type of transformer commonly used by utilities in residential areas. The invention can also be used with a transformer having more than two bushings, e.g., other forms of multiple bushing transformers.

Further to FIG. 1, cover 12 encloses upper end 14 and bushings 16,17, in accordance with the principle of the invention, preventing animals such as birds and squirrels from alighting thereon, thus preventing such animals from causing a short circuit between transformer 11 and adjacent high voltage power lines. Cover 12 is fashioned from acrylic plastic, ceramic material, or other substantially rigid non-conductive material or combination of non-conductive materials. Cover 12 can be integrally fashioned, if desired, or fashioned as an assembly of attached parts, whether two or more. When attached to transformer 11, cover 12 may be considered part of transformer 11 or otherwise an extension of transformer 11. As seen in the various drawings, cover 12 is transparent and constructed, in accordance with a preferred embodiment, of clear acrylic plastic. Cover 12 need not be transparent. However, the transparency of cover 12 is highly desirable because it permits visual inspection of upper end 12 of transformer 11 and bushings 17,18 contained thereby. Cover 12 can be entirely transparent, if desired. The majority of cover 12 can be transparent, if desired. In accordance with the invention, only a portion or selected portions of cover 12 can be transparent. In this regard, the invention contemplates cover 12 having one or more transparent windows permitting visual inspection of upper end 14 of transformer 11 and bushings 17,18.

Figure 2:
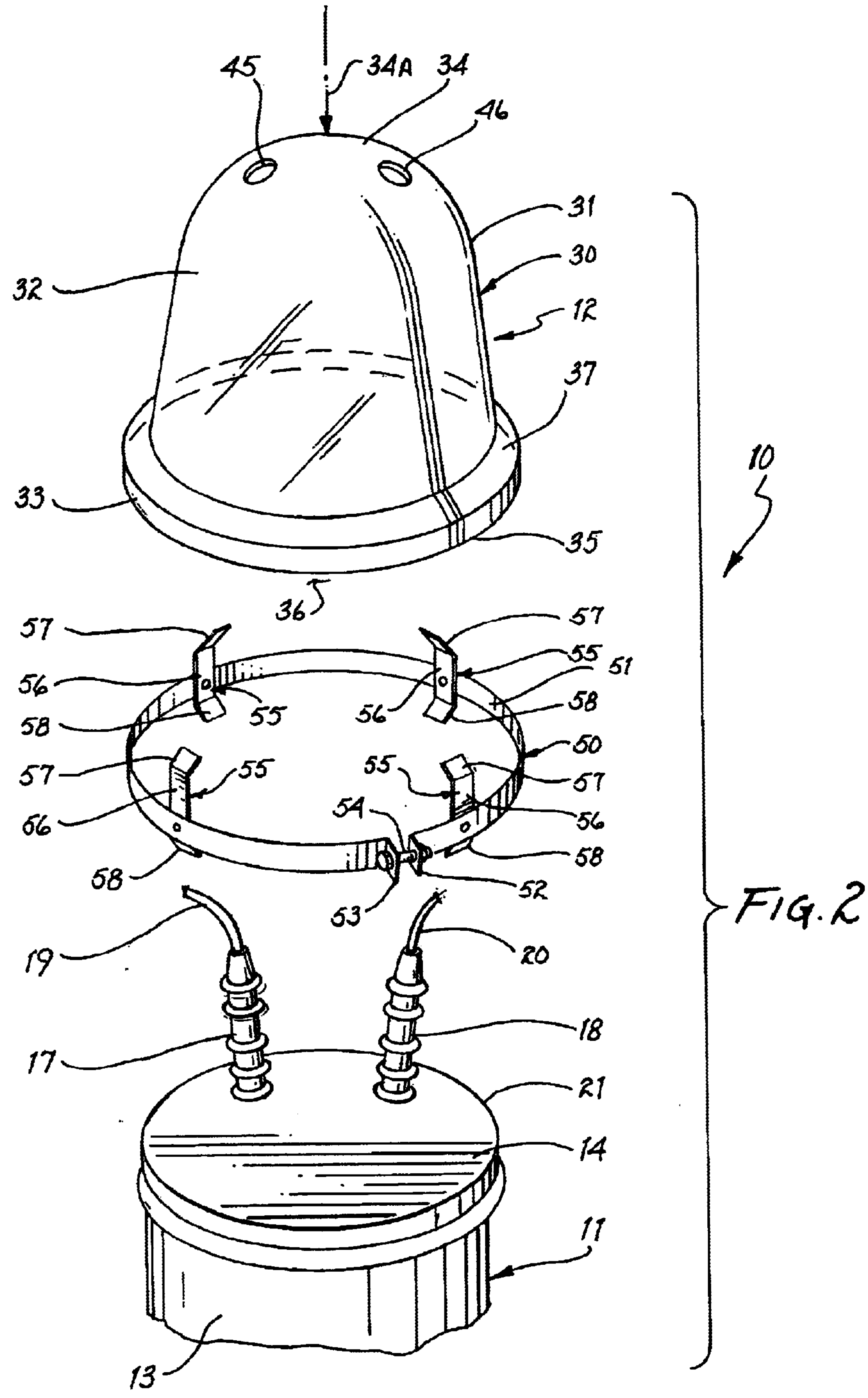
FIG. 2 is an exploded view of the transformer assembly of FIG. 1, in which a portion of the transformer is broken away for illustrative purposes.

Referring to FIG. 2, cover 12 is a generally dome-shaped body 30 consisting of a generally cylindrical upstanding continuous sidewall 31 having an outer surface 32, an inner surface 29 (FIG. 3), a proximal/lower end 33 and an opposing distal/upper end 34. Upper end 34 is rounded, and defines a central apex 34A. Upper end 34 can be more pointed or entirely pointed, if desired. A continuous rim or perimeter extremity/edge 35 characterizes lower end 33, which bounds a main opening 36 leading into cover 12. Perimeter edge 35 is part of an attached annular skirt 37 of cover 12, which further characterizes lower end 33 of cover 12. Lower end 33 is considered an attachment end of cover 12 and, more particularly, an annular attachment end as defined by perimeter edge 35 and, more generally, annular skirt 37.

Figure 3:
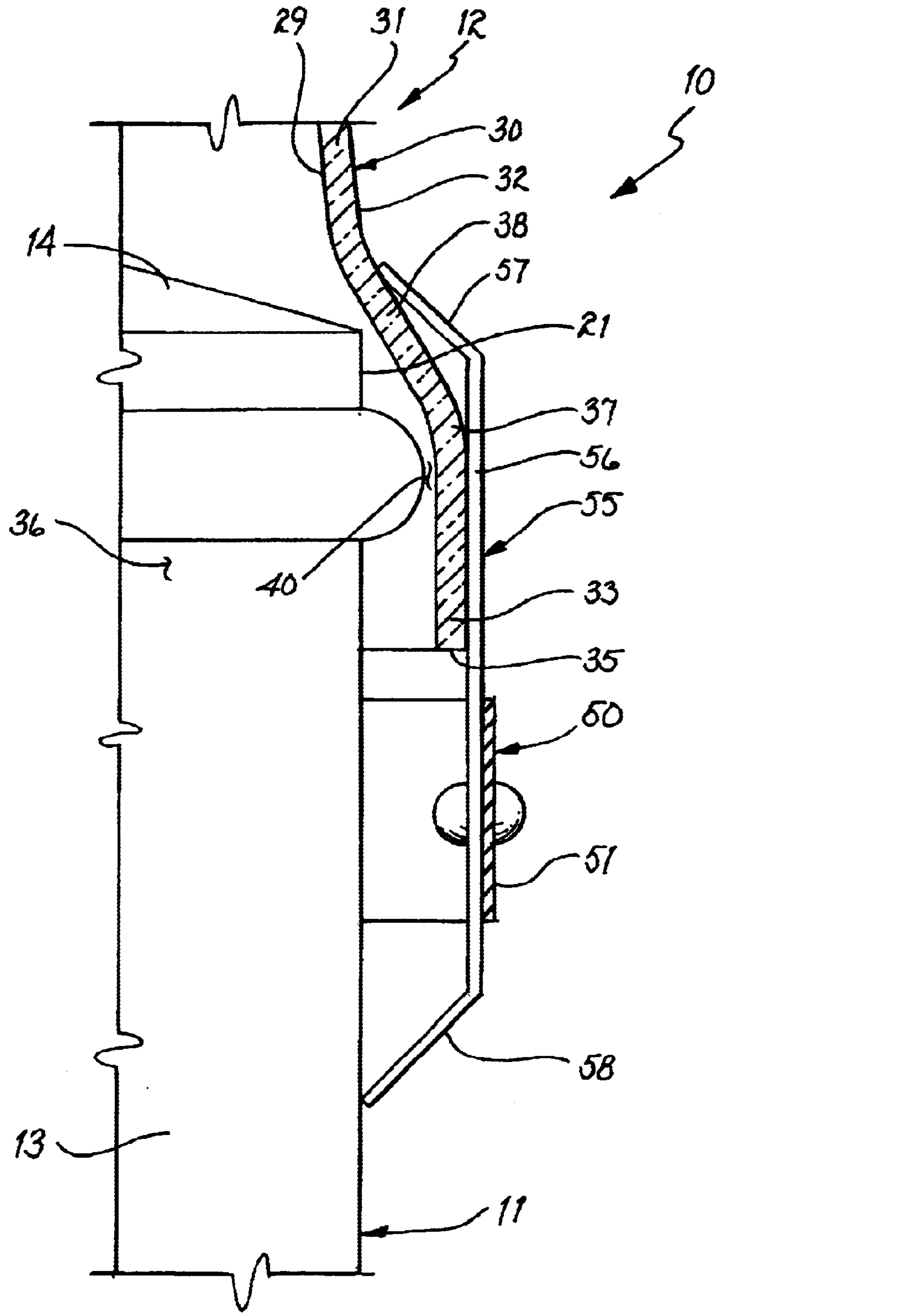
FIG. 3 is sectional view taken along line 3—3 of FIG. 1.

When attached to transformer 11 as seen in FIG. 1 in accordance with the principle of the invention, cover 12 encloses upper end 14 and bushings 16,17, shielding upper end 14 of transformer 11 and bushings 17,18 preventing animals from alighting on upper end 14 and bushings 17,18. In the attachment of cover 12 to transformer 11 as seen in FIG. 1, the attachment end of cover 12 is directed over bushings 17,18 and onto and over upper end 14, in which a portion of upper end 14 extends into and through opening 36 (not referenced in FIG. 1). Skirt 37 encircles and presents against upper end 14 and, more particularly, marginal perimeter extremity 21, and this aspect is illustrated generally in FIG. 3. The diameter of opening 36, which is defined by perimeter edge 35 of cover 12, is somewhat greater than the outer diameter of upper end 14 of transformer 11 as defined by marginal perimeter extremity 21, permitting upper end 34 of transformer 11 to fit therethrough. As seen in FIG. 3, skirt 37 has an inwardly angled portion 38, which is disposed adjacent upper end 14 of transformer 11 and, more particularly, perimeter extremity 21. Portions of angled portion 38 present against marginal perimeter extremity 21 permitting cover 12 to rest upon upper end 14 of transformer 11. A gap 40 exists between the attachment end of cover 12 and transformer 11 as referenced in FIG. 3, permitting water and debris to pass outwardly from inside cover 12 preventing the buildup of moisture and debris inside cover 12 at upper end 14 of transformer 11 and bushings 17,18, which could otherwise cause short circuiting to occur.

And so as seen in FIG. 1, lower end 33 of cover 12 completely encircles upper end 14 of transformer 11. Sidewall 31 extends upwardly from upper end 14 of transformer 11 to upper end 34, which, along with apex 34A, opposes upper end 14 of transformer 11 and overlies bushings 17,18. Openings 45,46 extend through cover 12, which are disposed at upper end 34 proximate apex 34A. Conductor 19 extends outwardly from cover 12 through opening 45, and conductor 20 extends outwardly from cover 12 through opening 46. Outer surface 32 of cover 12 is sufficiently angled/inclined to frustrate animals from alighting thereon. When mounted upon transformer 11, as described above, cover 12 protects and encloses upper end 14 of transformer 11 and bushings 17,18 preventing the building of nests by animals such as squirrels and birds.

In the immediate embodiment, an attachment member 50 is used to secure cover 12 to transformer 11. Attachment member 50 is preferably non-conductive, and fashioned from non-conductive material or a combination of non-conductive materials. Attachment member 50 can be constructed of steel, aluminum or other selected metal or metallic material, and then coated with a non-conductive coating so as to exhibit non-conductive properties, if desired. Looking to FIGS. 1 and 2, attachment member 50 consists of band 51 of sufficient length to encircle transformer 11. Band 51 terminates at one end with outwardly directed flange 52 and at the other end with outwardly directed flange 53. Flanges 52,53 each include an opening to receive bolt 54 therethrough. Flanges 52,53 are spaced apart. When bolt 54 is tightened, flanges 52,53 will are forced together causing band 38 to constrictively engage transformer 11.

Attached to band 51 at spaced intervals are gripping members 55. Although four are illustrated, more or less can be used. Gripping members 55 are each identical and include a central section 56 and opposing inwardly directed upper and lower extremities 57,58. Central sections 56 are secured to band 38 with rivets, screws, welding or other mechanical fastening structure. Band 51 encircles transformer 11 beneath lower end 33 of cover 12. When band 51 is tightened around transformer 11, upper extremities 57 engage and grip/hold cover 12, and lower sections 58 engage and grip/hold the outer surface of housing 13 of transformer. Band 51 is illustrative of an easy and inexpensive mechanism for releasably securing cover 12 to transformer 11. It will be understood that cover 12 can be secured to transformer 11 in other ways, such as with one or more belts, brackets, clamps, mutual snap fasteners, mutual threaded fasteners, etc. It is to be understood that transformer 11 and cover 12 can be constructed and arranged with mutually engagable attachment pairs, whether mutually engagable threaded attachment pairs, snap attachment pairs, etc.

It is preferred to provide the releasable attachment of cover 12 to transformer 11 and any suitable releasably engagable attachment structure can be used for accomplishing this. The attachment end of cover 12 can be welded to transformer or otherwise substantially permanently or immovably secured to transformer 11. Cover 12 can be assembled with transformer. 11 during the construction of transformer 11, Cover 12 can also be assembled with transformer 11 during the installation of transformer 11.

Figure 4:
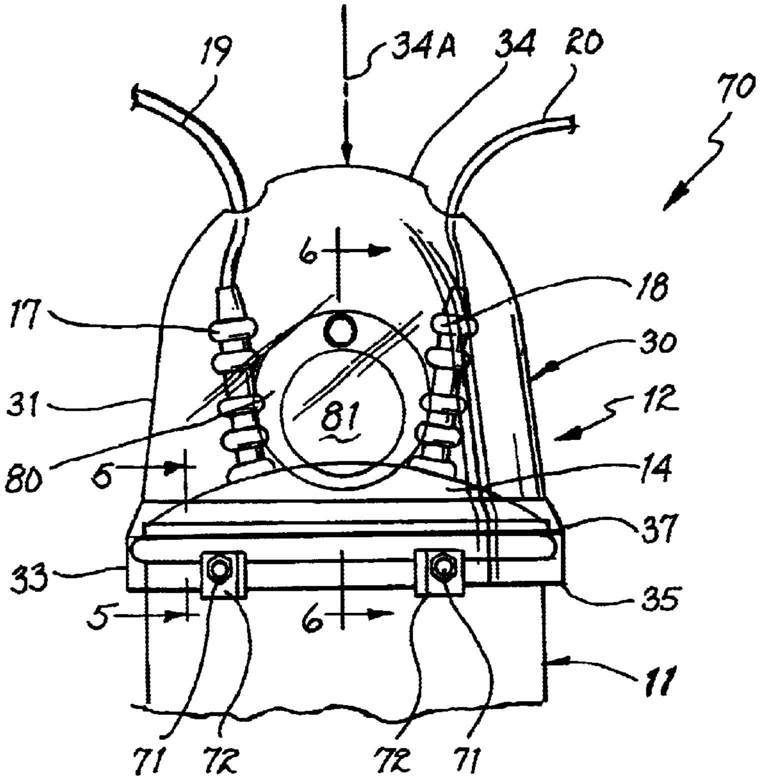
FIG. 4 is a side elevation of a transformer assembly including a transformer having an attached cover fashioned with an access panel, in accordance with an alternate embodiment of the invention.
Figure 5:
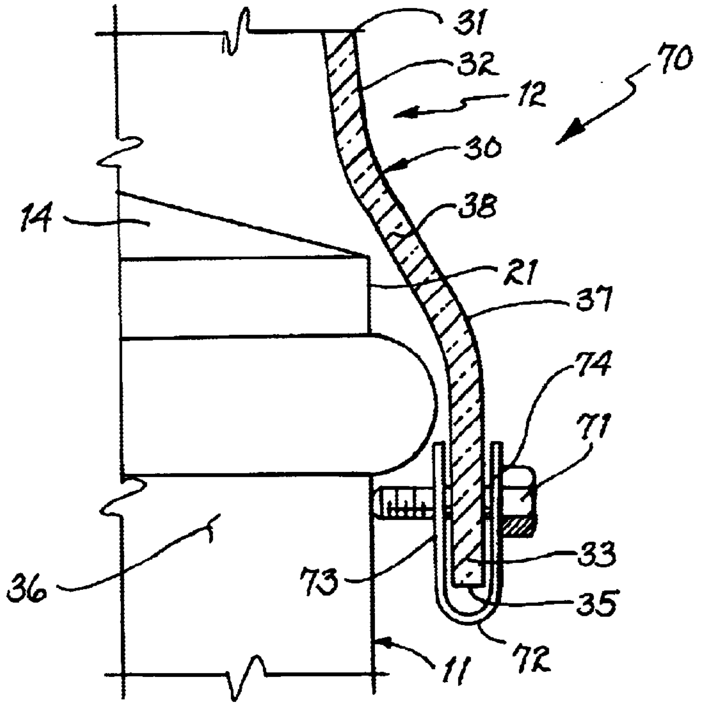
FIG. 5 is a sectional view taken along line 5—5 of FIG. 4.

Attention is now directed to FIG. 4, in which is seen a transformer assembly 70 constructed and arranged in accordance with an alternate embodiment of the invention. In common with the previous embodiment designated 10, the immediate embodiment shares transformer 11 and cover 12, including body 30, sidewall 31, lower end 33, upper end 34 including apex 34A, perimeter edge 35 and skirt 37, in addition to other common referenced components. In accordance with the immediate embodiment designated 70, skirt 37 is formed with openings that extend therethrough and are disposed at spaced intervals. These openings receive bolts 71. With additional reference to FIG. 5, each opening is fitted with a U-shaped attachment 72. Legs 73,74 each have an opening extending therethrough. The opening in leg 73 aligns with the opening in leg 74. Both openings are sized and threaded to receive a bolt 71 therethrough. Bolts 71 are tightened against transformer 11, securing cover 12 thereto. The embodiment designated 70 in FIGS. 4 and 5 is illustrative of an alternate way of securing cover 12 to transformer 11. In FIGS. 4 and 5, cover 12 is secured to transformer 11 enclosing its upper end the bushings preventing animals from alighting thereon.

Figure 6:
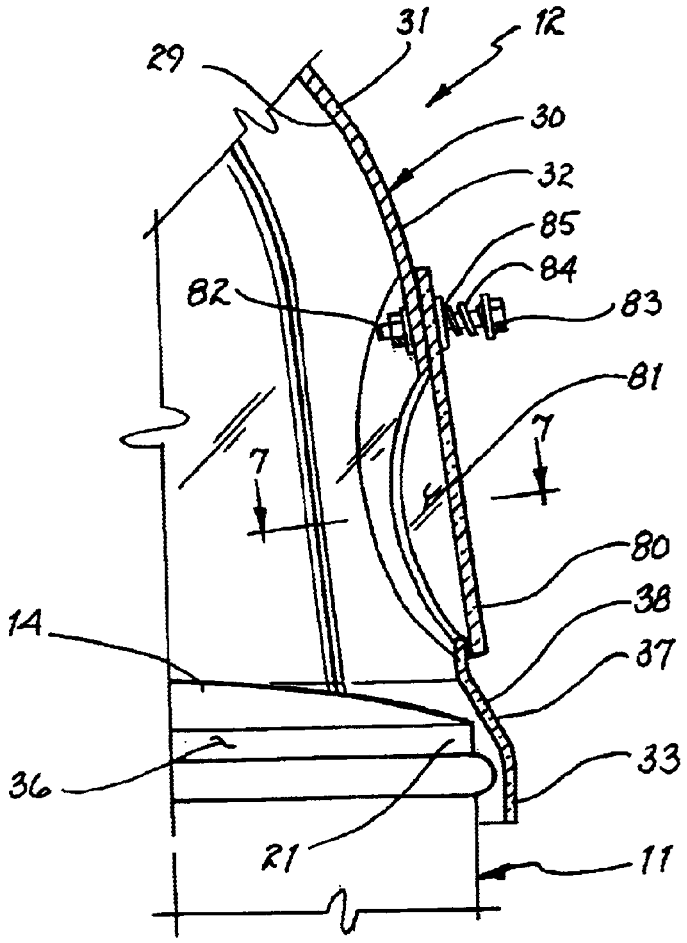
FIG. 6 is a sectional view taken along line 6—6 of FIG. 4.
Figure 7:
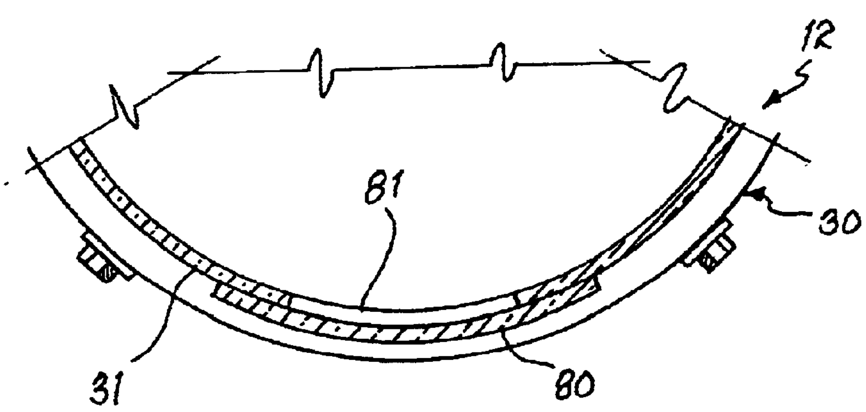
FIG. 7 is a sectional view taken along line 7—7 of FIG. 6.

Further to FIG. 4 and also to FIG. 6, cover 12 has an attached access door/panel 80 which is movable between a closed position and an open positioning revealing an opening 81 permitting access into cover 12 and to upper end 14 and bushings 17,18 of transformer 11 for facilitating maintenance and repair as the need arises without having to detach cover 12 from transformer 11. Opening 81 extends through sidewall 31 between lower end 33 and upper end 34. In its closed position, access panel 80 overlies and closes opening 81. Access panel 80 has a matching curvature to sidewall 31 of cover 12, and this aspect is illustrated in FIG. 7. Access panel 80 is preferably constructed of the same material or combination of materials as the remaining portions of cover 12. However, access panel 80 can be constructed of any suitable material, whether transparent. The invention contemplates access panel 80 fashioned of transparent material, and the remaining structure of cover 12 fashioned of non-transparent material, in which access panel 80 provides the window though which upper end 14 of transformer 11 and bushings 17,18 can be visually inspected.

In the immediate embodiment, access panel 80 is secured to cover 12 by a nut 82 and bolt 83 assembly. A spring 84 encircles bolt 83 and is captured between the head of bolt 83 and a washer 85 encircling bolt 83 and disposed against access panel 80. Access panel 80 pivots about bolt 83, and is capable of being pivoted between its closed position overlying and closing opening 81 and its open position away from opening 81 permitting access into the interior of cover 12. Those having regard for the art will appreciate that access panel 80 can be attached to cover 12 in other ways so as to be capable of being disposed in its closed position and its open position. Any suitable pivoting or hinged structure can be used for attaching access panel 80 to cover 12. Rather than a pivoting or hinged attachment to cover, access panel 80 and cover 12 can incorporate attachment structure that requires access panel 80 to be detached from cover 12 for disposing access panel 80 in its open position.

The present invention is described above with reference to preferred embodiments. However, those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus comprising:

a transformer having an end;

a first electrical insulator bushing attached to and extending away from the end of the transformer;

a first conductor extending from the first electrical insulator bushing;

a cover having a first opening, the cover affixed to the transformer shielding the end of the transformer and the first electrical insulator bushing preventing animals from alighting on the end of the transformer and the first electrical insulator bushing; and the first conductor extending through the first opening of the cover.

2. Apparatus of claim 1, wherein the cover has an outer surface that is sufficiently angled to frustrate animals from alighting thereon.

3. Apparatus of claim 1, wherein at least a portion of the cover is transparent.

4. Apparatus of claim 3, wherein the first opening of the cover is disposed proximate the apex.

5. Apparatus of claim 1, further comprising means releasably affixing the cover to the transformer.

6. Apparatus of claim 1, wherein the cover is fashioned with an attached access panel movable between a closed position and an open position permitting access therethrough to the end of the transformer and the first electrical insulator bushing.

7. Apparatus of claim 1, further comprising:

a second electrical insulator bushing attached to and extending away from the end of the transformer;

a second conductor extending from the electrical insulator bushing;

the cover having a second opening; and the second conductor extending through the second opening of the cover.

8. Apparatus comprising:

a transformer having an end;

first and second electrical insulator bushings attached to and extending away from the end of the transformer;

a first conductor extending from the first electrical insulator bushing;

a second conductor extending from the second electrical insulator bushing;

a cover having a first opening, a second opening, and an attachment end affixed to the transformer;

the cover shielding the end of the transformer and the first and second electrical insulator bushings preventing animals from alighting on the end of the transformer and the first and second electrical insulator bushings;

the first conductor extending through the first opening of the cover; and the second conductor extending through the second opening of the cover.

9. Apparatus of claim 8, wherein the cover has an outer surface that is sufficiently angled to frustrate animals from alighting thereon.

10. Apparatus of claim 8, wherein at least a portion of the cover is transparent.

11. Apparatus of claim 10, wherein the first and second openings of the cover are disposed proximate the apex.

12. Apparatus of claim 8, further comprising means releasably affixing the attachment end of the cover to the transformer.

13. Apparatus of claim 8, wherein the cover is fashioned with an attached access panel movable between a closed position and an open position permitting access therethrough to the end of the transformer and the first and second electrical insulator bushings.

14. Apparatus of claim 8, further comprising a gap between the attachment end of the cover and the transformer.

15. Apparatus comprising:

a transformer having an end;

a first electrical insulator bushing attached to and extending away from the end of the transformer;

a first conductor extending from the first electrical insulator bushing;

a cover having an access panel and a first opening, the cover affixed to the transformer shielding the end of the transformer and the first electrical insulator bushing preventing animals from alighting on the end of the transformer and the first electrical insulator bushing;

the first conductor extending through the first opening of the cover; and the access panel movable between a closed position and an open position permitting access therethrough to the end of the transformer and the first electrical insulator bushing.

16. Apparatus of claim 15, wherein the cover has an outer surface that is sufficiently angled to frustrate animals from alighting thereon.

17. Apparatus of claim 15, wherein at least a portion of the cover is transparent.

18. Apparatus of claim 17, wherein the first opening of the cover is disposed proximate the apex.

19. Apparatus of claim 15, further comprising means releasably affixing the cover to the transformer.

20. Apparatus of claim 15, further comprising:

a second electrical insulator bushing attached to and extending away from the end of the transformer;

a second conductor extending from the electrical insulator bushing;

the cover having a second opening; and the second conductor extending through the second opening of the cover.

21. Apparatus comprising:

a transformer having an end;

first and second electrical insulator bushings attached to and extending away from the end of the transformer;

a first conductor extending from the first electrical insulator bushing;

a second conductor extending from the second electrical insulator bushing;

a cover having a first opening, a second opening, an attached access panel, and an attachment end affixed to the transformer;

the cover shielding the end of the transformer and the first and second electrical insulator bushings preventing animals from alighting on the end of the transformer and the first and second electrical insulator bushings;

the first conductor extending through the first opening of the cover;

the second conductor extending through the second opening of the cover; and the access panel movable between a closed position and an open position permitting access therethrough to the end of the transformer and the first and second electrical insulator bushings.

22. Apparatus of claim 21, wherein the cover has an outer surface that is sufficiently angled to frustrate animals from alighting thereon.

23. Apparatus of claim 21, wherein at least a portion of the cover is transparent.

24. Apparatus of claim 23, wherein the first and second openings of the cover are disposed proximate the apex.

25. Apparatus of claim 21, further comprising means releasably affixing the attachment end of the cover to the transformer.

26. Apparatus of claim 21, further comprising a gap between the attachment end of the cover and the transformer.

27. In a transformer including an upper end having a perimeter edge and at least one attached electrical conductor assembly consisting of an electrical insulator bushing attached to and extending away form the upper end of the transformer and a conductor extending from the electrical insulator bushing, apparatus comprising:

a cover having an annular attachment end, an opposing distal extremity, and an opening;

means for releasably securing the annular attachment end of the cover to the perimeter edge of the upper end of the transformer so as to permit the cover to shield the end of the transformer and the electrical insulator bushing preventing animals from alighting on the end of the transformer and the electrical insulator bushing; and the opening of the cover for accommodating the conductor.

28. Apparatus of claim 27, wherein the cover has an outer surface that is sufficiently angled to frustrate animals from alighting thereon.

29. Apparatus of claim 27, wherein the cover has an apex disposed at the distal extremity thereof opposing the annular attachment end.

30. Apparatus of claim 27, wherein the opening of the cover is disposed proximate the distal extremity.

31. Apparatus of claim 27, wherein the cover is fashioned with an attached access panel movable between a closed position and an open position.

32. Apparatus of claim 27, wherein the cover is transparent.

33. Apparatus of claim 27, wherein at least a portion of the cover is transparent.

* * * * *